United States Patent [19]

Blesser

[11] Patent Number: 4,694,124
[45] Date of Patent: * Sep. 15, 1987

[54] DIGITIZING TABLET SYSTEM INCLUDING A TABLET HAVING A GRID STRUCTURE MADE OF TWO ORTHOGONAL SETS OF PARALLEL UNIFORMLY SIZED AND SPACED U SHAPED LOOPS OF CONDUCTIVE MATERIAL

[75] Inventor: Barry Blesser, Raymond, N.H.

[73] Assignee: Pencept, Inc., Waltham, Mass.

[*] Notice: The portion of the term of this patent subsequent to Apr. 15, 2003 has been disclaimed.

[21] Appl. No.: 790,883

[22] Filed: Dec. 9, 1985

Related U.S. Application Data

[63] Continuation of Ser. No. 592,879, Mar. 23, 1984, Pat. No. 4,582,955.

[51] Int. Cl.$^4$ .............................................. G08C 21/00
[52] U.S. Cl. ...................................................... 178/19
[58] Field of Search .............................. 178/18, 19, 20

[56] References Cited

U.S. PATENT DOCUMENTS

| | | | |
|---|---|---|---|
| 3,399,401 | 8/1968 | Ellis et al. | 340/324 |
| 3,618,019 | 11/1971 | Nemirovsky et al. | 340/146 |
| 3,647,963 | 3/1972 | Bailey | 178/19 |
| 3,700,809 | 10/1972 | Nadon | 178/87 |
| 3,705,956 | 12/1972 | Dertouzos | 178/18 |
| 3,732,369 | 5/1973 | Cotter | 178/18 |
| 3,735,044 | 5/1973 | Centner | 178/19 |
| 3,873,770 | 3/1975 | Ioannou | 178/18 |
| 3,974,332 | 8/1976 | Noda et al. | 178/18 |
| 3,975,592 | 8/1976 | Carvey | 178/18 |
| 3,999,012 | 12/1976 | Dym | 178/18 |
| 4,009,338 | 2/1977 | Dym et al. | 178/18 |
| 4,088,842 | 5/1978 | Ikedo | 178/19 |
| 4,213,005 | 7/1980 | Cameron | 178/18 |
| 4,240,065 | 12/1980 | Howbrook | 340/146.3 |
| 4,243,843 | 1/1981 | Rocheleau | 178/19 |
| 4,289,927 | 9/1981 | Rodgers | 178/19 |
| 4,368,351 | 1/1983 | Zimmer | 178/19 |
| 4,471,162 | 9/1984 | Aono et al. | 178/18 X |

FOREIGN PATENT DOCUMENTS 0110131 10/1983 European Pat. Off. .
2080539 2/1982 United Kingdom .

OTHER PUBLICATIONS

Patent Abstracts of Japan, vol. 8, No. 275 (P-321), [1712], Dec. 15, 1984.
Patent Abstracts of Japan, vol. 8, No. 271 (P-320), [1708], Dec. 12, 1984.
Patent Abstracts of Japan, vol. 7, No. 241, (P-232), [1386], Oct. 26, 1983.
IBM Technical Disclosure Bulletin, vol. 22, No. 3 (pp. 1245-1251), Aug. 1979.
SID International Symposium Digest of Technical Papers (pp. 32-35), May 1985.

Primary Examiner—Stafford D. Schreyer
Attorney, Agent, or Firm—Robert M. Asher

[57] ABSTRACT

A digitizing tablet system having a stylus which is inductively coupled to a grid is disclosed. The grid includes a first plurality of narrow uniformly sized and spaced U shaped loops of conductive material disposed to define a first coordinate axis of the grid and a second plurality of narrow uniformly sized and spaced U shaped loops of conductive material disposed to define a second coordinate axis of the grid. One end point of each loop in each plurality of loops is connected to a common conductor which serves as one output terminal for that plurality of loops. The other end point of each loop in the same plurality of loops is connected to a multiplexor whose output is connected to a conductor which serves as the other output terminal for that plurality of loops. Voltage signals induced in the loops when the stylus is positioned above the grid and a coil in the stylus is energized are processed to generate data signals corresponding to the position of the stylus relative to the grid structure. Since the loops are uniform in size and shape, nonlinearities in the relationship between the induced voltage and the computed stylus position from one loop to the next are eliminated. In addition, because the loops are narrow in size the amount of stray electromagnetic interference picked up by the loops from external sources is minimized.

11 Claims, 10 Drawing Figures

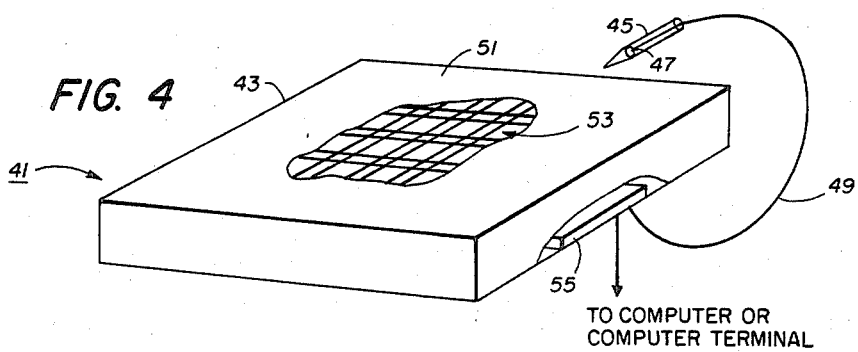
FIG. 4
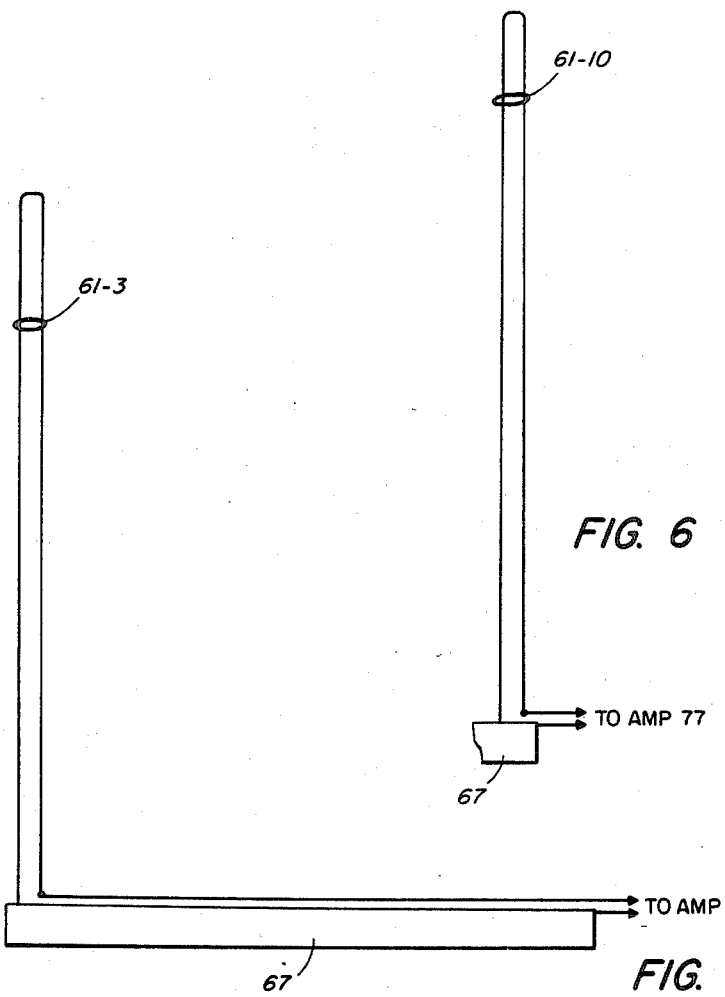
FIG. 6
FIG. 7

DIGITIZING TABLET SYSTEM INCLUDING A TABLET HAVING A GRID STRUCTURE MADE OF TWO ORTHOGONAL SETS OF PARALLEL UNIFORMLY SIZED AND SPACED U SHAPED LOOPS OF CONDUCTIVE MATERIAL

This is a continuation of co-pending application Ser. No. 592,879, filed on Mar. 23, 1984, now U.S. Pat. No. 4,582,955.

BACKGROUND OF THE INVENTION

The present invention relates generally to digitizing tablet systems and more particularly to digitizing tablet systems which include a conductive grid structure and a stylus structure which is inductively coupled to the conductive grid structure.

Digitizing tablet systems are well known in the art and are used in a variety of applications. These systems generally include a tablet, a stylus and some instrumentality for producing some form of interaction between the stylus and the tablet from which is derived data signals representing the position of the stylus on the tablet.

In a number of these systems the tablet includes a housing having a two dimensional work support surface and a grid of conductive elements and the stylus contains an electric coil. The coil in the stylus is inducively coupled to the grid in the tablet by energizing either the coil or the grid with an AC voltage signal. The voltage signal induced in the other component is then measured. The measured signals are then used to determine the position of the stylus relative to the grid.

The grid in inductive coupling type digitizing tablet systems very often comprises a first set of parallel equally spaced straight wires and a second set of parallel equally spaced straight wires which are at right angles to the first set of wires. One end of each wire in each set is connected to a common conductor having one end which serves as one terminal for the set. The other end of each wire in the set is connected to a multiplexor or other similar device having an end which is connected to a conductor which serves as the other terminal for the set. The multiplexor allows the individual wires in the set to be enabled sequentially. The two terminals for each set are coupled to the electronics portion of the system where signal processing is performed. By energizing the coil in the stylus, voltages will be induced in the individual wires or, alternatively, by energizing the individual wires, voltages will be induced in the coil in the stylus. The induced voltage signals are processed to produce data signals representing the position of the stylus relative to the grid.

In the past, it has been considered that the size of the induced voltage signal is directly related to the proximity of the coil in the stylus to the particular wire in the grid from which the induced voltage signal is derived. The problem with this line of reasoning is that it is not entirely correct. More specifically, the induced voltage generated in or from a wire is not related exclusively to the proximity of the coil in the stylus to the particular wire but rather to the overall loop defined mainly by the particular wire in the grid wire but also including the common conductor, the multiplexor and the connections from the common conductor and the multiplexor to the associated electronics. Since the individual wires are straight, equally spaced from one another, and connected at opposite ends to common elements, the size or area of the overall loop related to each individual wire will be different even though the distance between wires is the same. Because the loops are differently sized, the induced voltages related to each wire will be different. For example, assume a voltage signal of 1 volt is applied to the coil of the stylus and that the stylus is positioned 0.1 inches from a wire in the grid which forms part of an overall loop having an area of 12 square inches and that the induced voltage detected by that wire is 0.1 volts. If the stylus is positioned 0.1 inches from another wire in the grid which forms an overall loop having an area of 80 square inches, the induced voltage detected by that wire will not be 0.1 volts but will be somewhat smaller, such as 0.04 volts.

In addition, as the size of the overall loop increases, the amount of stray fringe fields picked up by the loop also increases.

As can be appreciated, both of the above phenomina will produce nonlinearities or errors in the relationship between the induced voltage signals and the computed stylus position which in many applications are undesirable and/or unacceptable.

In U.S. Pat. No. 4,243,843 to R. T. Rocheleau there is disclosed an apparatus for determining the distance of a point on a surface from an axis on the surface comprising a cursor having a magnetisable element adapted to be energized by an alternating voltage, a grid of substantially parallel spaced conductors, the cursor being movable thereover and inductively coupled thereto, means for sequentially enabling only one of said conductors to conduct a current induced by the alternating voltage at any one time, means for comparing percentages of the amplitudes of currents induced in successively enabled conductors, means for sensing a change in the phase of the induced current, and means responsive to the comparing means and the sensing means for counting the number of conductors which have been enabled at the time a phase change is sensed.

In U.S. Pat. No. 3,873,770 to J. T. Ioannou there is disclosed a system for digitizing graphic data from a worksheet by tracing out or pointing to curves and points on the worksheet with a stylus. A tablet having a surface to receive the worksheet includes a conductor grid defining two perpendicular axes of measurement. The conductors are sequentially excited and a coil in the stylus picks up an impluse having an envelope which shows positive and negative peaks spaced by a distance 2 h, where h is coil height above the grid plane measured along the stylus axis. The conductor grid planes are physically displaced from the tablet surface by some small but finite distance thus giving rise to an apparent position error if the stylus is tilted during use; i.e., the indicated position will be the projected intersection of the stylus axis with the grid plane, not the surface. Means are provided for detecting stylus tilt and variations in h and to compensate for position errors.

In U.S. Pat. No. 3,647,963 to K. N. Bailey there is described a device for determining position coordinates of points on a surface which includes a conducting grid structure having at least two grid elements to be placed over or under a surface and a cursor structure having a circular conducting loop element to be moved across the surface of the grid structure. An alternating electric signal is supplied to either the cursor conducting loop or to each of the conducting grid elements. This signal induces a signal in each element of the unexcited conducting structure. Position coordinates are determined by apparatus which measures the induced signal or signals and records the signal change produced when the cursor is moved across the grid surface. Several embodiments of measuring devices which determine the distance between arbitary points on a surface such as a map, graph or photograph are illustrated. Automatic plotting embodiments are also shown and described in which the plotting motion is determined by comparing signals representing the measured loop position on the grid with a preselected set of command signals.

In U.S. Pat. No. 3,705,956 to M. L. Dertouzos there is described a graphic data tablet comprising a tablet having first and second opposite faces; at least first and second conductor means mounted to said first face of said tablet, said first conductor means disposed in a first path corresponding to a first bit in the Gray Code, said first path occupying a first area of said first face, said second conductor means disposed in a second path corresponding to a second bit in the Gray Code, said second path occupying a second area of said first face, said first and second areas being separate and distinct, said first and second conductor means being coplanar; means for sequentially passing a signal through said first and second conductor means; and sensing means electromagnetically communicating with said first and second conductor means for sensing said signal sequentially passed through said first and second means.

Other known patents of interest include U.S. Pat. No. 3,974,332 to Abe et al; U.S. Pat. No. 4,368,351 to S. E. Zimmer; U.S. Pat. No. 3,975,592 to P. C. Carvey; U.S. Pat. No. 3,999,012 to H. Dym; U.S. Pat. No. 3,700,809 to D. J. Nadon; U.S. Pat. No. 3,732,369 to W. L. Cotter; U.S. Pat. No. 3,735,044 to R. M. Centner; U.S. Pat. No. 3,399,401 to T. O. Ellis et al; U.S. Pat. No. 4,213,005 to E. A. Cameron; and U.S. Pat. No. 4,289,927 to J. L. Rodgers.

It is an object of this invention to provide a new and improved digitizing tablet system.

It is another object of this invention to provide a new and improved inductive coupling type digitizing tablet system.

It is still another object of this invention to provide a new and improved grid structure for an inductive coupling type digitizing tablet system.

It is yet still another object of this invention to provide a grid structure for an inductive coupling type digitizing tablet system which does not produce nonlinear relationship between induced voltage signals and the computed stylus position.

It is a further object of this invention to provide a grid structure for an inductive coupling type digitizing tablet system in which interference from stray magnetic fields is minimized.

It is another object of this invention to provide a grid structure for an inductively coupled digitizing tablet system in which the overall loops containing the conductive elements are substantially equal in size and shape.

It is still another object of this invention to provide a technique for interpolating induced voltage signals derived from a grid of uniformly sized and spaced U shaped loops of conductive material to determine position.

SUMMARY OF THE INVENTION

A digitizing tablet system constructed according to the teachings of the present invention includes a stylus structure having a magnetizable element, a housing having a two dimensional work surface, a grid structure in the housing, said grid structure including a first plurality of uniformly sized and spaced U shaped loops of conductive material disposed in a plane parallel to said work surface and defining a first coordinate axis and a second plurality of uniformly sized and spaced U shaped loops of conductive material disposed in a plane parallel to said work surface and defining a second coordinate axis, means for energizing one of said grid structure and said stylus structure with an alternating voltage and producing by electromagnetic induction voltage signals in the other one of said structure related to the position of said stylus structure relative to said grid structure, and processing means for processing said induced voltage signals to produce data signals corresponding to the position of the stylus structure relative to the grid structure.

The foregoing and other objects and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

FIG. 4 is a simplified view partly broken away in parts of a digitizing tablet system constructed according to the teachings of the present invention;

FIG. 6 is a schematic view of the overall loop containing the loop element at one end of one of the sets of loop elements in the grid structure shown in FIG. 5;

FIG. 7 is a schematic view of the overall loop containing the loop element at the other end of the same set of loop elements in the grid structure shown in FIG. 5;

DETAILED DESCRIPTION OF PREFERRED EMBODIMENT

The present invention is directed to a digitizing tablet system which includes a conductive grid structure and a stylus structure having a magnetizable element which provides inductive coupling to the conductive grid structure when either one of the conductive grid structure or the magnetizable element are energized and wherein the conductive grid structure is configured to avoid nonlinearities in the relationship between the induced voltage signal and the computed stylus position relative to the grid structure and is configured to minimize noise and interference in the induced voltage signals caused by extraneous sources. The present invention accomplishes this by providing a grid structure which is configured to define a pair of orthogonal sets of narrow parallel uniformly sized and spaced U shaped loops of conductive material. The loops are connected to the electronics position of the system in an arrangement whereby the overall area of the loop containing a loop element is essentially equal to the area of the loop element itself. In use, induced voltage signals derived from the individual conductive loop elements are processed to produce data signals corresponding to the position of the stylus relative to the grid of loop elements. The processing includes an interpolation technique based on a barabolic curve assumption to determine the coordinates of the position wherein the induced voltage signal would be at a maximum.

Figure 1:
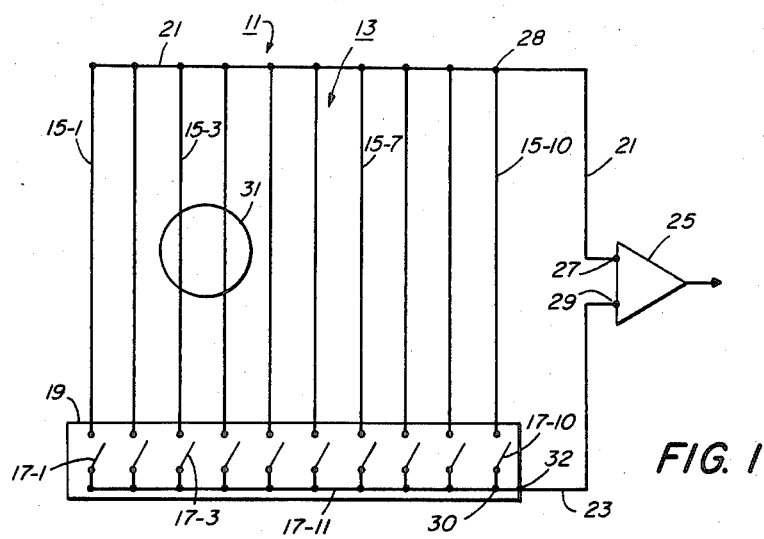
FIG. 1 is a schematic view of a typical prior art straight wire type grid configuration used in an inductive coupling type digitizing tablet system.

Referring now to the drawings, there is illustrated in FIG. 1 a schematic diagram of a portion of a typical prior art digitizing tablet system of the type wherein a coil structure is inductively coupled to a grid structure, the system being identified generally by reference numeral 11. For simplicity, the wires defining only one of the coordinate axes are shown.

System 11 includes a grid 13 having a plurality of parallel uniformly spaced straight wires 15-1 through 15-10. Each wire 15 is coupled at one end with a respective switch 17-1 through 17-10 in a multiplexor 19. The end of each wire 15 opposite the end connected to the respective switch 17 is connected to a common conductor 21 which serves as one output line or terminal or grid 13. Multiplexor 19 is connected to another conductor 23 which serves as a second output line or terminal of grid 13. An amplifier 25 has two inputs 27 and 29 which are respectively coupled to conductors 21 and 23. Disposed above grid 13 is stylus (not shown) having a coil 31.

In the past, it has been considered that the voltage induced in each wire 15 is dependent exclusively on the proximity of the coil 31 to the particular wire 15. However, as noted above, the induced voltage signal is not dependent exclusively on the wire alone but rather the overall loop which contains the wire.

Figure 3:
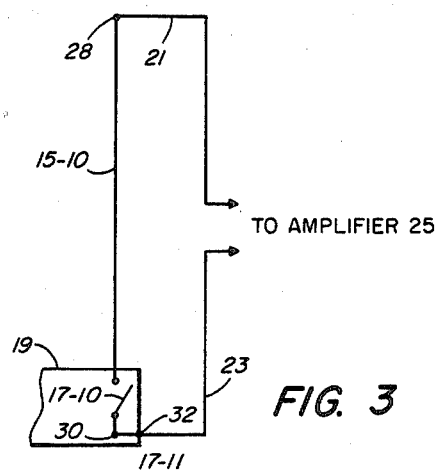
FIG. 3 is a schematic view of the overall loop which includes the straight wire at the other end of the grid configuration shown in FIG. 1.
Figure 2:
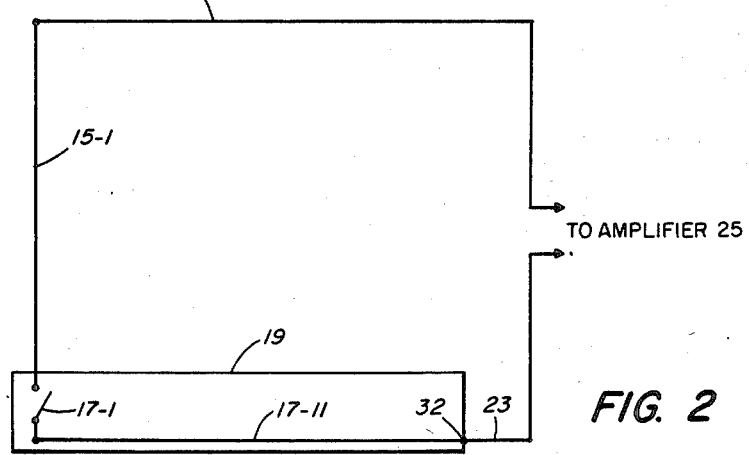
FIG. 2 is a schematic view of the overall loop which includes the straight wire at one end of the grid configuration shown in FIG. 1.

For convenience, the overall loop containing wire 15-1 is shown separately in FIG. 2 and the overall loop containing wire 15-10 is shown separately in FIG. 3. The loop containing wire 15-1 includes conductor 21, wire 15-1, switch 17-1 common line 17-11 in multiplexor 19 and conductor 23. On the other hand, the loop containing wire 15-10 includes the section of conductor 21 from terminal 27 in amplifier 25 to junction 28, wire 15-10, switch 17-10, the section of line 17-11 from junction 30 to terminal 32 and conductor 23.

As can be seen, the loop containing wire 15-1 is considerably larger in area than the loop containing wire 15-10. Consequently, the relationship of the voltage signal induced in the loop containing wire 15-1 when coil 31 is at certain distance from wire 15-1 to the stylus position will not be the same as the relationship of voltage signal induced in the loop containing wire 15-10 to the stylus position when coil 31 is at the same distance from wire 15-10. Furthermore, the loop containing wire 15-1 will pick up more stray fringe magnetic fields than the loop containing wire 15-10, because of its larger size.

For illustrative purposes, the invention will hereinafter be described with reference to an inductively coupled digitizing tablet system in which voltage signals are applied to the coil in the stylus causing signals to be induced in the grid. However it is to be understood that the voltage signals may be applied to the grid rather than the coil in the stylus, causing signals to be induced in the coil in the stylus rather than the grid.

Referring now to FIG. 4 there is illustrated a digitizing tablet system constructed according to the teachings of this invention and identified generally by reference numeral 41.

System 41 includes a tablet 43 and a stylus 45. Stylus 45 includes a coil 47 which is coupled to the electronics in tablet 43 by a pair of wires which are shown for simplicity as a single wire 49. Tablet 43 includes a generally rectangularly shaped housing having a top flat surface 51 on which may be placed a worksheet (not shown). The worksheet is maintained in place by any suitable means (also not shown). Disposed inside tablet 43 is a conductive grid structure 53 and the electronics 55. Grid structure 53 is spaced below top surface 51 a finite distance, such as around 0.125".

Figure 5:
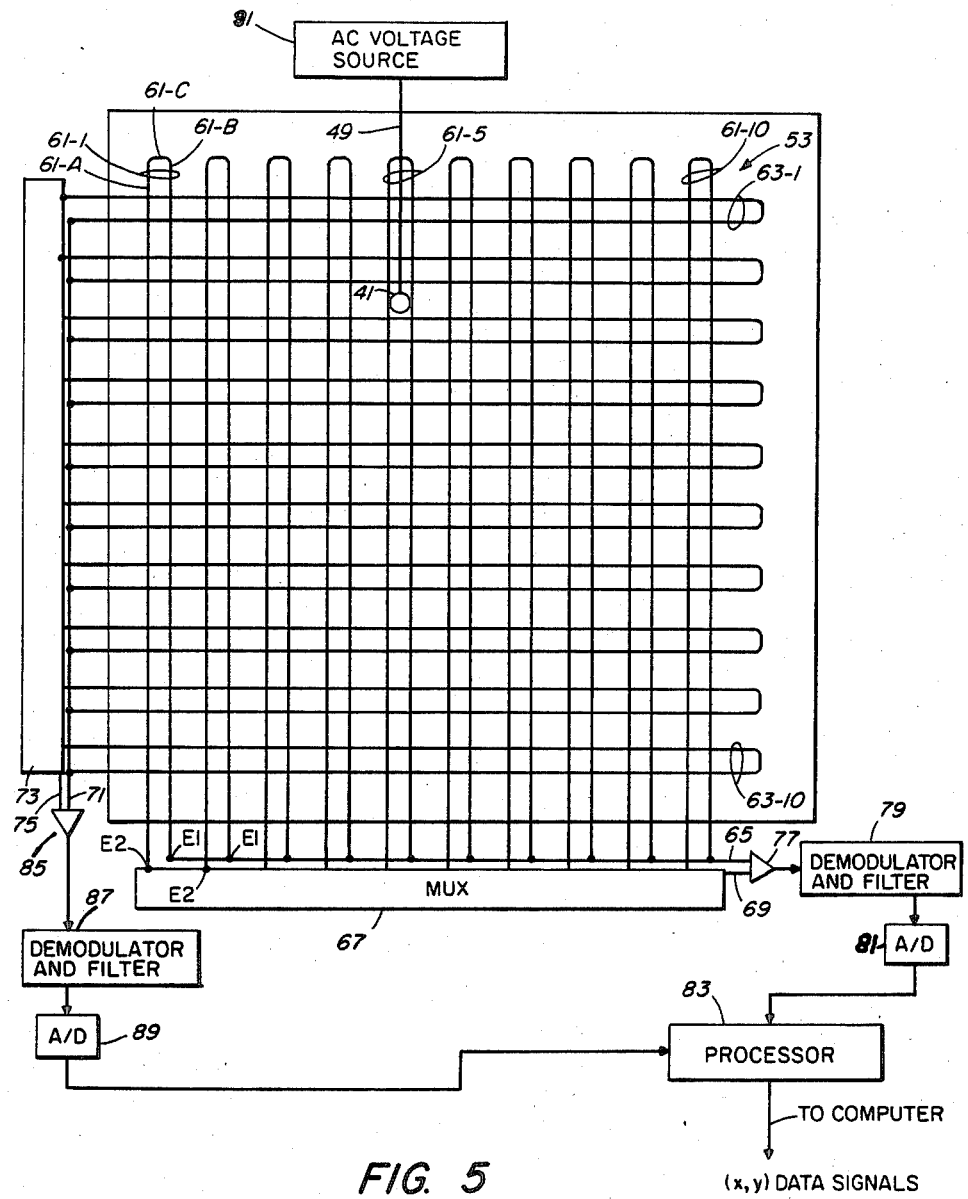
FIG. 5 is a schematic view of the grid structure and associated electronics in the digitizing tablet system shown in FIG. 4.

Referring now to FIG. 5 there is illustrated the details of the grid structure 53 and the associated electronics 55.

Grid structure 53 includes a first plurality of elongated narrow parallel U shaped conductive loops (identified by reference numerals) 61-1 through 61-10, the number of loops shown being for illustrative purposes only. Loops 61-1 through 61-10 are uniformly spaced, equal in size and shape and disposed in a plane parallel to surface 51, defining one coordinate axis, or the "X" axis of measurement. Each loop 61 includes a first leg or longitudinal loop section, a second leg or longitudinal loop section and a first transverse or connecting loop section. The two longitudinal loop sections are parallel. In loop 61-1 the first and second longitudinal loop sections and the transverse loop sections are identified as 61-1A, 61-1B and 61-1C respectively.

Grid structure further includes a second plurality of elongated parallel narrow U shpaed conductive loops 63-1 through 63-10, the number of loops shown also being for illustrative purposes only. Loops 63-1 through 63-10 are uniformly spaced, equal in size and shape and disposed in a plane parallel to and spaced from loop elements 61-1 through 61-10 at right angles thereto and defining a second coordinate axis, or the "Y" axis of measurement. The loop size and spacing of both pluralities of loops are preferably the same.

Loops 61 and 63 may either be individual wires of conductive material or lengths of conductive material on a printed circuit board.

One end point $E_1$ of each loop 61 is connected to a common conductive element 65 which serves as one output terminal or line for loops 61 and the other end point $E_2$ of each loop 61 is connected to a multiplexor 67 having an output line 69 which serves as the other output terminal or line for loops 61. Output line 65 is very close to multiplexor 67 and the two output lines 65 and 69 are very close to each other. Similarly, loops 63 are connected to a common conductive element 71 and a multiplexor 73 having an output line 75.

The overall loop containing loop 61-1 is shown separately in FIG. 6 and the overall loop containing loop 61-10 is shown separately in FIG. 7. Since conductive element 65 is disposed physically very close to multiplexor 67 and output line 69 the area between wire 65 and multiplexor 67 is very small or negligable. Thus, the overall loop area of the loop containing loop 61-1 is essentially equal to the area of loop 61-1 and the overall loop area of the loop containing loop 61-10 is essentially equal to the area of loop 61-10. Similarly, the overall loop areas of each one of the loops containing loop 63-1 through 63-10 is essentially equal to the areas of loops 63-1 through 63-10.

As can be appreciated, since the loop elements in each group are identical in size and shape, the signal induced in one loop, such as loop 61-1, when coil 47 is a certain distance therefrom will be the same as the signal induced in another loop such as loop 61-5 when coil 47 is at the same distance therefrom. In addition, since all loops are equal in size, the stray noise or fringe fields picked up by the loops will be about the same for each loop. Furthermore, since the loops are relatively narrow the stray noise or fringe fields will be at a minimum.

Coil 47 has a diameter that is slightly less than the width of a loop.

In use, the maximum signal induced in a loop will occur when the coil 41 is aligned directly between the two longitudinal wires of a loop.

Conductive elements 65 and 69 are connected to an amplifier 77 whose output is fed into a demodulator and filter combination 79. The output of demodulator and filter combination 79 is fed into a A/D converter 81. The output of A/D converter 81 is fed into a processor 83. Conductive elements 71 and 75 are connected to an amplifier 85 whose output is fed into a demodulator and filter combination 87. The output of demodulator and filter combination 87 is fed into a A/D converter 89 whose output is also connected to processor 83.

The output of processor 83 is connected to a computer or display terminal 83.

Coil 41 is coupled to an AC voltage source 91.

Figure 8:
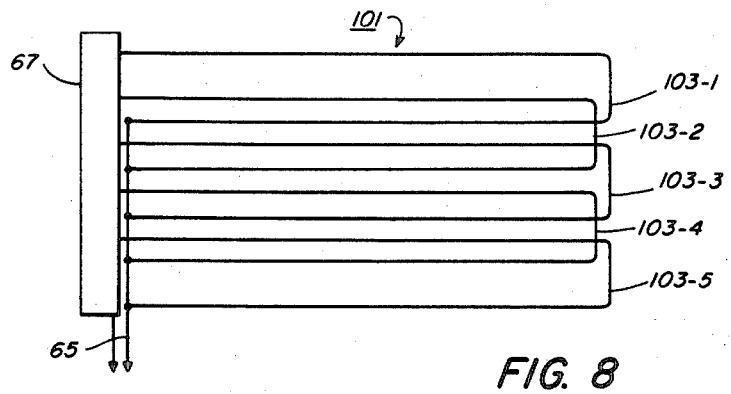
FIG. 8 is a schematic view of another embodiment of the grid structure of the invention.

In FIG. 8 there is illustrated another embodiment of grid structure identified by reference numeral 101. For simplicity, only one of the sets of loop elements are shown. The set includes a plurality of loop elements 103-1 to 103-5 which are identical in size and shape to loop elements 61. The number of loops in the set is for illustrative purposes only.

Loops 103 are uniformly spaced but are disposed in overlapping relationship. Because the loop elements are disposed in overlapping relationship, the number of loop elements and hence the number of readings that may be obtained for a given length along the axis of measurement is increased.

In the operation of digitizing tablet system 41, a voltage signal from AC voltage source 91 is applied to coil 47 in stylus 45 producing flux patterns linking coil 47 to grid 53. This will induce voltages in the loop elements of grid 53. The amplitude of the induced voltage signals in each loop element will be a function of the distance from coil 47 to the particular loop element. The largest induced voltage signal will be generated from a loop element when coil 47 is positioned directly over the loop element.

The voltage signals generated in loop elements 61 are fed sequentially into amplifier 77. The amplified voltage signal outputs from amplifier 77 are filtered and demodulated by filter and demodulator unit 79 and then converted into digital signals by A/D converter 81. The output data signals from A/D converter 81 are fed into processor 83. The induced voltage signals from loop elements 63 are similarly amplified, filtered, demodulated, converted to digital signals and fed into processor 83. In processor 83 the two sets of data signals, one from loop elements 61 and the other from loop elements 63 are processed to produce data signals corresponding to the exact position of stylus 45 relative to grid 61.

The processing in processer 83 involves determining the peak of a parabolic curve defined by three points or readings, the first point corresponding to the largest induced voltage signal detected and the other two points corresponding to the amplitudes of the induced voltage signals from the two loop elements on either side of the loop element producing the largest induced voltage signal.

Figure 9:
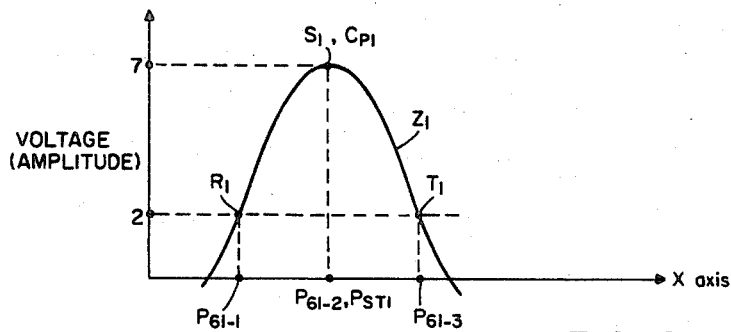
FIGS. 9 and 10 are graphs useful in understanding how readings from a set of loop shaped conductive elements are interpolated to determine the exact position of the stylus relative to the grid.
Figure 10:
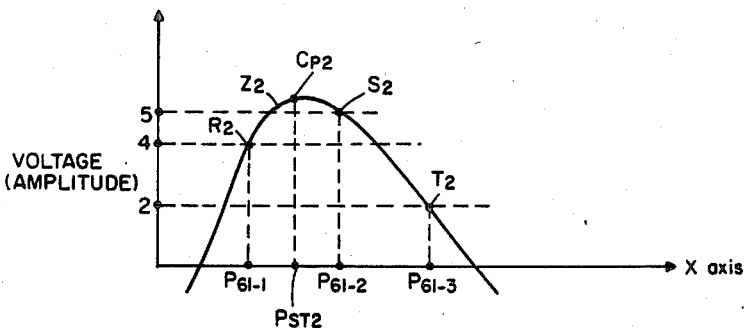

The processing in processor 83 may be best understood by referring to FIGS. 9 and 10.

FIG. 9 is a graph of voltage amplitude vs. loop element position for loop elements 61-1, 61-2 and 61-3 when coil 47 of stylus 45 is directly over the center of coil element 61-2. In the graph, point $R_1$ represents the amplitude of the induced voltage signal from coil element 61-1, point $S_1$ represents the amplitude of the induced voltage signal from coil element 61-2 and point $T_1$ represents the amplitude of the induced voltage signal from coil element 61-3. $P_{61-1}$ is the position of loop element 61-1 along the X-axis, $P_{61-2}$ is the position of loop element 61-2 along the X axis and $P_{61-3}$ is the position of loop element 61-3 along the X axis. The three points $R_1$, $S_1$ and $T_1$ are joined together by a parabolic shaped curve $Z_1$. As can be seen, point $S_1$ is at the peak $CP_1$ of curve $Z_1$ and the stylus position $P_{ST1}$ is at the center of coil 61-2.

FIG. 8 illustrates a graph of the induced voltages from the same three coil elements when coil 47 is positioned between coils 61-1 and 61-2. The three amplitude points, labelled $R_2$, $S_2$ and $T_2$, are joined together by a parabolic curve $Z_2$. In this case, the peak $CP_2$ of the parabolic curve $Z_2$ is between points $R_2$ and $S_2$ and the stylus position $P_{ST2}$ is between the position $P_{61-1}$ of loop 61-1 and the position $P_{61-2}$ of loop 61-2.

The stylus position corresponding to the peak of the parabolic curve may be calculated by the formula:

$$P_{Stylus} = P_s + \tfrac{1}{2} L_d \frac{(V_s - V_r) + (V_t - V_s)}{(V_s - V_r) - (V_t - V_s)} \quad (1)$$

Where:
  $P_{Stylus}$ = the actual position of the stylus along the axis of measurement.
  $P_s$ = The position along the axis of measurement of the loop element having the largest detected induced voltage signal.
  $L_d$ = the distance between loop elements along the axis of measurement.
  $V_s$ = the amplitude of the largest detected voltage.
  $V_r$ = the amplitude of the voltage detected by the loop element on one side of the loop element having the largest detected voltage.
  $V_r$ = the amplitude of the voltage detected by the loop element on the other side of the loop element having the largest detected voltage.
For example, if
  $P_s$ = 7 units
  $L_d$ = 2 units
  $V_r$ = 4 volts $V_s = 9$ volts, and
$V_t = 5$ volts
Then:

$$P_{Stylus} = 7 + \frac{1}{2}(2)\frac{(9-4)+(5-9)}{(9-4)-(5-9)}$$

$$= 7.111 \text{ units}$$

The position of stylus 45 along both axes of measurement is obtained in this manner.

As can be appreciated, the accuracy of the interpolation technique described above is based on the assumption that a curve of the amplitude of the electromagnetic field along an axis of measurement is parabolic in shape in the region near the top of the curve. The assumption, however, is dependent somewhat on the exact geometry of the loop width, loop size, loop length, coil diameter and coil length etc. By suitable choices of these parameters relative to each other, the curve of the electromagnetic field can be made to be an almost perfect parabolic shape. An example of parameters that will produce a curve that is parabolic in shape at the top region is as follows:

Loop width 0.8"
Loop spacing 0.2"
Coil height from grid 0.5"
Coil length 0.6"
Coil diameter 0.3"

other combinations may be obtained by emperical measurements or by computer simulations.

The parabolic shape of the top region of the curve may be further improved by using a coil that is frustoconically shaped rather than cylindrically shaped.

In order to improve the performance of the loops at their tops or outer ends (i.e. where the two longitudinal loop sections are connected to the transverse loop sections) the shape of the outer ends may be slightly tapered rather than rectangular as shown. The bottoms of the loops (i.e. where they are coupled to the common conductor and multiplexor) may also be slightly tapered.

The plurality of loops making up each set need not all terminate on the same side of the tablet. Some loops may terminate on one side and others on the other side, it only being necessary that the loop areas and shapes be equal.

Instead of having a separate amplifier, demodulator and filter combination and A/D converter for each set of loops defining one axis of measurement, a single amplifier, demodulator and filter combination and A/D converter may be shared by both sets of loops through a suitable multiplexing arrangement.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A digitizing tablet system comprising:
    a. a housing having a two dimensional work surface,
    b. a grid structure in said housing, said grid structure including a first plurality of spaced parallel U-shaped conductive loop elements equal in size disposed in a plane parallel to said work surface and defining a first coordinate axis and a second plurality of spaced parallel U-shaped conductive loop elements equal in size disposed in a plane parallel to said work surface and defining a second coordinate axis,
    c. a magnetizable coil indicating a position relative to said first and second coordinate axes of said grid structure,
    d. means for providing an alternating voltage signal to energize said magnetizable coil so as to produce by electromagnetic induction voltage signals in the loop elements of said grid structure related to the position indicated by said coil relative to the axes of said grid structure, and
    e. processing means for processing said induced voltage signals to determine the position indicated by said coil relative to an axis of said grid structure as a function of three positions defined by a U-shaped loop having the largest induced voltage and the U-shaped loops on either side thereof.

2. The digitizing tablet system of claim 1 wherein said processing means comprises means for demodulating said induced voltage signals and means for digitizing said demodulated signals.

3. The digitizing tablet system of claim 1 wherein the loop elements in each plurality of loops are arranged in an overlapping relationship.

4. The digitizing tablet system of claim 1 wherein said magnetizable coil has a diameter which is less than the width of a loop element.

5. The digitizing tablet of claim 4 wherein said processing means includes means for defining a parabolic curve containing the largest induced voltage measured from a U-shaped loop and the induced voltages measured from the U-shaped loop on either side thereof and means for determining the position relative to an axis of the peak of said parabolic curve.

6. A digitizing tablet system comprising:
    a. a housing having a two dimensional work surface,
    b. a grid structure in said housing, said grid structure including a first plurality of spaced parallel U-shaped conductive loop elements equal in size disposed in a plane parallel to said work surface and defining a first coordinate axis and a second plurality of spaced parallel U-shaped conductive loop elements equal in size disposed in a plane parallel to said work surface and defining a second coordinate axis,
    c. a magnetizable coil having a diameter less than the width of a loop element, said coil indicating a position relative to said first and second coordinate axes of said grid structure,
    d. means for providing an alternating voltage signal to energize said magnetizable coil so as to produce by electromagnetic induction voltage signals in the loop elements of said grid structure related to the position indicated by said coil relative to the axes of said grid structure,
    e. means for demodulating said induced voltage signals,
    f. means for digitizing said demodulated signals, and
    g. processing means for processing said digitized signals to produce data signals corresponding to the position indicated by said coil relative to the axes of said grid structure.

7. The digitizing tablet system of claim 6 wherein said processing means produces data signals corresponding to the position indicated by said coil as a function of the positions of the U-shaped loop having the largest induced voltage and the positions of the U-shaped loop on either side thereof.

8. The digitizing tablet system of claim 7 wherein said function defines a peak of a parabola including the U-shaped loop having the largest induced voltage and the U-shaped loop on either side thereof.

9. The digitizing tablet system of claim 6 wherein the loop elements in each plurality of loops are arranged in an overlapping relationship.

10. A digitizing tablet system comprising:
   a. housing having a two dimensional work surface,
   b. a grid structure in said housing, said grid structure including a first plurality of overlapping parallel U-shaped conductive loop elements equal in size disposed in a plane parallel to said work surface and defining a first coordinate axis and a second plurality of overlapping parallel U-shaped conductive loop elements equal in size disposed in a plane parallel to said work surface and defining a second coordinate axis,
   c. a magnetizable coil having a diameter less than the width of a loop element, said coil indicating a position relative to said first and second coordinate axes of said grid structure,
   d. means for providing an alternating voltage signal to energize said magnetizable coil so as to produce by electromagnetic induction voltage signals in the loop elements of said grid structure related to the position indicated by said coil relative to the axes of said structure.
   e. means for demodulating said induced voltage signals,
   f. means for digitizing said demodulated signals, and
   g. processing means for processing said digitized signals to determine the position indicated by said coil relative to an axis of said grid structure as a function of three positions defined by a U-shaped loop having the largest induced voltage and the U-shaped loops on either side thereof.

11. The digitizing tablet system of claim 10 wherein said function is defined by a peak of a parabola defined by said three positions.

* * * * *